US009312727B2

(12) United States Patent
Lee

(10) Patent No.: US 9,312,727 B2
(45) Date of Patent: Apr. 12, 2016

(54) LOCAL MONITORING APPARATUS, MONITORING SYSTEM AND METHOD OF DIGITAL PROTECTIVE RELAY

(75) Inventor: Byung Jin Lee, Cheongju-Si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 774 days.

(21) Appl. No.: 13/528,654

(22) Filed: Jun. 20, 2012

(65) Prior Publication Data

US 2012/0330587 A1 Dec. 27, 2012

(30) Foreign Application Priority Data

Jun. 24, 2011 (KR) .................. 10-2011-0061951

(51) Int. Cl.
*H02J 13/00* (2006.01)
*H02H 3/08* (2006.01)
*H02H 3/33* (2006.01)

(52) U.S. Cl.
CPC .......... *H02J 13/0062* (2013.01); *H02J 13/0017* (2013.01); *H02H 3/08* (2013.01); *H02H 3/33* (2013.01)

(58) Field of Classification Search
CPC .................................................... H02J 13/0017
USPC ............................................................ 702/62
See application file for complete search history.

(56) References Cited

U.S. PATENT DOCUMENTS

| 6,469,629 | B1 * | 10/2002 | Campbell | ............ | H02H 1/0061 340/635 |
| 7,747,356 | B2 * | 6/2010 | Andarawis et al. | ............ | 700/292 |
| 2010/0013632 | A1 * | 1/2010 | Salewske et al. | ............. | 340/540 |

FOREIGN PATENT DOCUMENTS

| CN | 101588295 | 11/2009 |
| CN | 201466793 | 5/2010 |
| CN | 101882810 | 11/2010 |
| CN | 201860169 | 6/2011 |
| KR | 2003-0037019 | 5/2003 |

OTHER PUBLICATIONS

The State Intellectual Property Office of the People's Republic of China Application Serial No. 201210212315.3, Office Action dated Mar. 3, 2014, 9 pages.
Korean Intellectual Property Office Application Serial No. 10-2011-0061951, Office Action dated Nov. 20, 2012, 5 pages.

* cited by examiner

*Primary Examiner* — Bryan Bui
(74) *Attorney, Agent, or Firm* — Lee, Hong, Degerman, Kang & Waimey

(57) ABSTRACT

A local monitoring apparatus, a power distribution monitoring system of a digital protective relay, and a method using the same are disclosed herein. According to the embodiments of the present disclosure, a power distribution monitoring system of the digital protective relay may be configured with a local monitoring program and a self function of the digital protective relay, thereby reducing a cost burden due to the installation of a remote monitoring system. It may be connected to one or more digital protective relays through a remote monitoring connection line to transmit and receive data using a local monitoring dedicated protocol, thereby easily processing various data contained in the digital protective relay. Furthermore, according to the present disclosure, various setting values required for a plurality of digital protective relays, respectively, may be accessed and downloaded once, thereby enhancing the user's convenience and increasing management efficiency.

4 Claims, 4 Drawing Sheets

LOCAL MONITORING APPARATUS, MONITORING SYSTEM AND METHOD OF DIGITAL PROTECTIVE RELAY

CROSS-REFERENCE TO RELATED APPLICATIONS

Pursuant to 35 U.S.C. §119(a), this application claims the benefit of earlier filing date and right of priority to Korean Application No. 10-2011-0061951 filed on Jun. 24, 2011, the contents of which are incorporated by reference herein in its entirety.

BACKGROUND OF THE DISCLOSURE

1. Field of the Disclosure The present disclosure relates to a power distribution monitoring system and method using a digital protective relay for monitoring power distribution through different monitoring devices according to a communication protocol.

2. Background of the Disclosure

Power distribution is provided with various power transmission and receiving facilities for supplying power generated by a power generator to consumers, and typically a device for measuring and displaying electric energy among power transmission and receiving facilities may include an electricity meter and a digital protective relay.

FIG. 5 is a view schematically illustrating schematically illustrating electrical disconnection and connection of a power receiving facility in power distribution. Referring to FIG. 5, a metering out fit (MOF) 20 is connected to a power line 11 through which power is supplied from a power supply source 10, and an electricity meter 30 is connected to the metering out fit 20 to receive the voltage and current transformed by the metering out fit 20. Furthermore, a potential transformer (PT) 40 and a current transformer (CT) 50 are connected to the power line 11, and a digital protective relay 60 is connected to the potential transformer 40 and current transformer 50 and thus a voltage transformed by the potential transformer 40 and a current transformed by the current transformer 50 are input to the digital protective relay 60.

The digital protective relay 60 computes electric energy from the voltage and current received from the potential transformer 40 and current transformer 50. The digital protective relay 60 is a device for protecting a system (load) from various accidents such as over current accident, short current accident, ground-fault accident and the like that occur at power transmission and distribution lines by sending a block signal to the circuit breaker when various accidents occur to isolate the system from the accident occurred line. Furthermore, the digital protective relay 60 has a measuring instrument function for measuring the voltage and current to display power factor, electric power, an amount of electric power in addition to the power distribution and power facilities protection function.

SUMMARY OF THE DISCLOSURE

According to the embodiments of the present disclosure, an object thereof is to provide a local monitoring apparatus connected to one or more digital protective relays through a remote monitoring connection line to transmit and receive data using a local monitoring dedicated protocol, thereby monitoring a digital protective relay, a power distribution monitoring system of the digital protective relay, and a method using the same.

According to the embodiments of the present disclosure, another object thereof is to provide a local monitoring apparatus in which a power distribution monitoring system of a digital protective relay is provided with a local monitoring program and a self function of the digital protective relay, thereby solving problems due to the installation of a remote monitoring system, a power distribution monitoring system of the digital protective relay, and a method using the same.

In order to accomplish the foregoing objects, a local monitoring apparatus according to an embodiment may be provided with a local monitoring program, and connected to one or more digital protective relays having remote monitoring ports, respectively, through a remote monitoring connection line, and configured to transmit and/or receive data to and/or from the at least one or more digital protective relays using a local monitoring dedicated protocol. The local monitoring apparatus may include a storage unit configured to store the local monitoring program, a communication unit connected to the at least one or more digital protective relays through the remote monitoring connection line to transmit and receive the data, and a controller configured to execute the local monitoring program.

In order to accomplish the foregoing objects, a power distribution monitoring system of a digital protective relay according to an embodiment may include one or more digital protective relays provided with one or more remote monitoring ports, respectively, connected through a remote monitoring connection line to collect events occurred while monitoring power distribution and generate monitoring data, and a local monitoring apparatus provided with a local monitoring program, and connected to the one or more digital protective relays through the remote monitoring connection line to receive the monitoring data using a local monitoring dedicated protocol.

A power distribution monitoring system of a digital protective relay according to another embodiment may include one or more digital protective relays, a local monitoring apparatus, and a remote monitoring apparatus connected through the remote monitoring connection line to receive the monitoring data from the one or more digital protective relays through a remote monitoring dedicated protocol.

In the power distribution monitoring system of the digital protective relay, the one or more digital protective relays may include a communication module configured to transmit the monitoring data and receive control data, and a control module configured to determine a communication protocol of the monitoring data, and process the control data using the local monitoring dedicated protocol or the remote monitoring dedicated protocol according to a result of the determination.

In order to accomplish the foregoing objects, a method of monitoring power distribution in a digital protective relay may include allowing a digital protective relay to receive control data through a remote monitoring connection line, allowing the digital protective relay to determine a communication protocol of the received control data, and allowing the digital protective relay to process the control data according to a result of the determination step.

In addition, the method of monitoring power distribution in a digital protective relay may include allowing a local monitoring apparatus to execute a local monitoring program, allowing the local monitoring apparatus to access the digital protective relay through the remote monitoring connection line, and allowing the local monitoring apparatus to transmit the control data to the digital protective relay.

According to the embodiments of the present disclosure, a power distribution monitoring system of the digital protective relay may be configured with a local monitoring program and a self function of the digital protective relay, thereby reducing a cost burden due to the installation of a remote monitoring system and enhancing convenience based on the management.

According to the embodiments of the present disclosure, it may be connected to one or more digital protective relays through a remote monitoring connection line to transmit and receive data using a local monitoring dedicated protocol, thereby easily processing various data contained in the digital protective relay. Furthermore, according to the present disclosure, various setting values required for a plurality of digital protective relays, respectively, may be accessed and downloaded once, thereby enhancing the user's convenience and increasing management efficiency.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE DISCLOSURE

Figure 1:
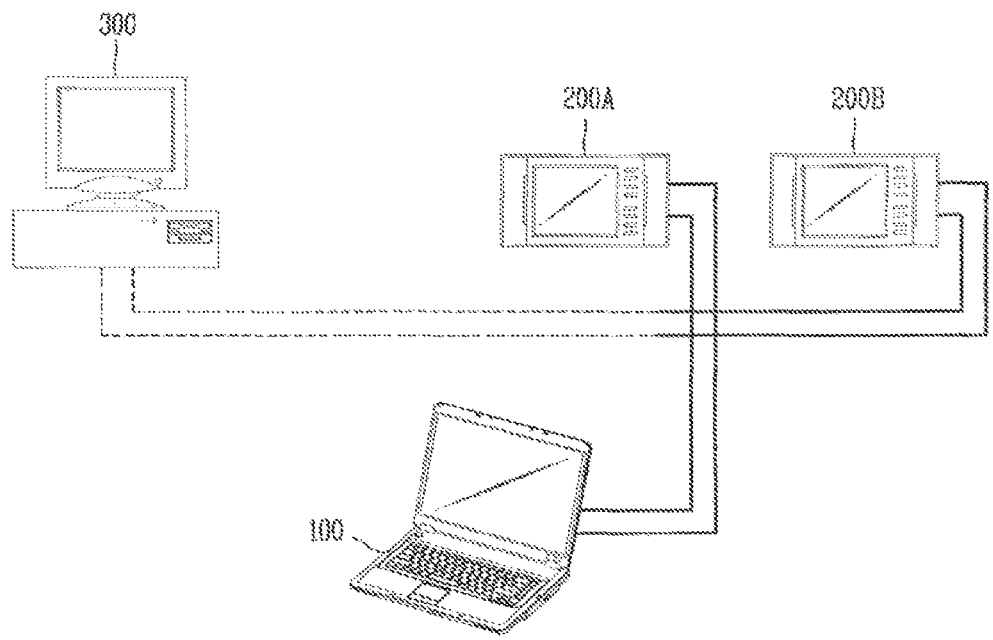
FIG. 1 is a view schematically illustrating the configuration of a power distribution monitoring system of a digital protective relay according to the embodiments of the present disclosure.

Referring to FIG. 1, a power distribution monitoring system of a digital protective relay according to an embodiment may include one or more digital protective relays (200A, 200B, . . . , 200N) provided with one or more remote monitoring ports, respectively, connected through a remote monitoring connection line to collect events occurred while monitoring power distribution and generate monitoring data, and a local monitoring apparatus 100 provided with a local monitoring program, and connected to the one or more digital protective relays 200 through the remote monitoring connection line to receive the monitoring data using a local monitoring dedicated protocol.

The local monitoring apparatus 100 according to embodiment may be provided with a local monitoring program, and connected to one or more digital protective relays 200 having remote monitoring ports 210, respectively, through a remote monitoring connection line, and configured to transmit and/or receive data to and/or from the at least one or more digital protective relays using a local monitoring dedicated protocol. Here, the remote monitoring connection line may be a serial communication line or Ethernet communication line. In other words, the remote monitoring connection line is RS-485, 422, Ethernet, or the like. Furthermore, the local monitoring program may be a PC manager program, and the local monitoring dedicated protocol is a PC manager dedicated protocol.

Figure 2:
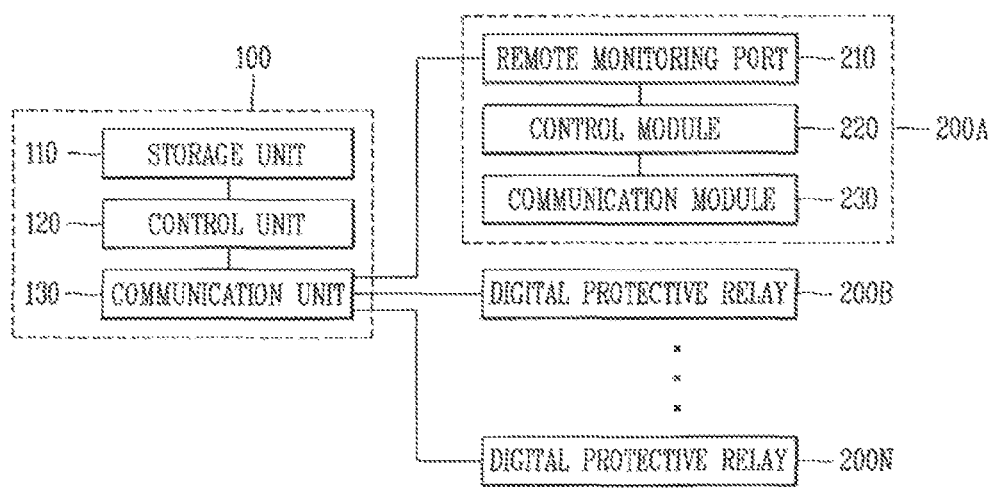
FIG. 2 is a view illustrating the detailed configuration and connecting relations of a plurality of digital protective relays and a local monitoring apparatus in FIG. 1.

Referring to FIG. 2, the local monitoring apparatus 100 may include a storage unit 110 configured to store the local monitoring program, a communication unit 120 connected to the at least one or more digital protective relays 200 through the remote monitoring connection line to transmit and receive the data, and a controller 130 configured to execute the local monitoring program. The storage unit 110 stores a local monitoring program, namely, a PC manager program. Furthermore, the storage unit 110 may store monitoring data received from each digital protective relay. The communication unit 120 is connected to a digital protective relay through a remote monitoring connection line such as RS-485, Ethernet, and the like to transmit control data and receive monitoring data. The controller 130 executes the local monitoring program, and controls each unit. Furthermore, the controller 130 monitors each digital protective relay. The controller 130 executes a local monitoring program, and then changes a setting value of the digital protective relay or transmits and receives data. The local monitoring apparatus may further include a display unit (not shown) for displaying monitoring data generated by one or more digital protective relays on the screen.

Referring to FIG. 1 again, a power distribution monitoring system of a digital protective relay according to another embodiment may further include a remote monitoring apparatus 300 connected through the remote monitoring connection line to receive the monitoring data from the one or more digital protective relays through a remote monitoring dedicated protocol, in addition to the one or more digital protective relays 200 and the local monitoring apparatus 100 according to an embodiment. Here, the remote monitoring dedicated protocol is a remote SCADA protocol such as MODBUS or distributed network protocol (DNP) such as DNP 3.0. For example, as an industrial standard protocol used to acquire information of power distribution, DNP may be used as a communication scheme, particularly, between the monitoring apparatus and the digital protective relay.

Referring to FIG. 2, the one or more digital protective relays 200 may include a remote monitoring port 210 for performing the role of connecting to a local monitoring apparatus 100 or remote monitoring apparatus 300 through a remote monitoring connection line.

The digital protective relay 200 may further include a communication module 220 for transmitting monitoring data and receiving control data. The communication module 220 receives control data from the local monitoring apparatus or remote monitoring apparatus, and transmits monitoring data to the local monitoring apparatus or remote monitoring apparatus.

The digital protective relay 200 may further include a control module 230 for determining a communication protocol of the control data. The control module 230 processes the control data using the local monitoring dedicated protocol or the remote monitoring dedicated protocol according to a result of the determination.

The digital protective relay 200 may further include a protection program of the relay and a storage module (not shown) for storing a drive program. The storage module may use all types of readable and writable memories. In addition, the storage module may further store information on communication protocols, monitoring data, control data, and the like.

Figure 3:
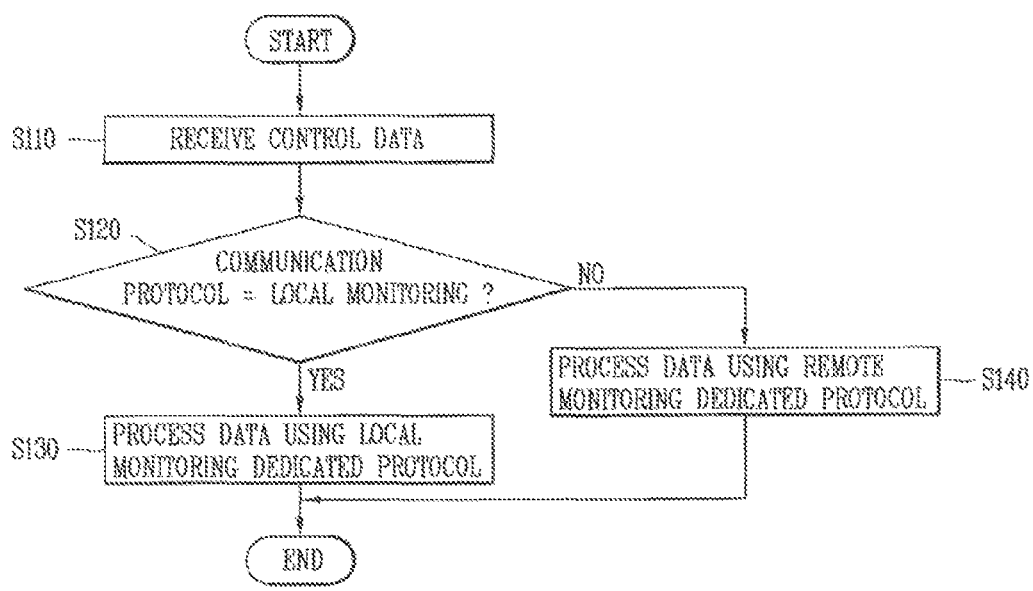
FIG. 3 is a flow chart schematically illustrating a method of monitoring power distribution in a digital protective relay according to an embodiment.

Referring to FIG. 3, a power distribution monitoring method of a digital protective relay according to an embodiment may include allowing a digital protective relay to receive control data through a remote monitoring connection line (S110), allowing the digital protective relay to determine a communication protocol of the received control data (S120), and allowing the digital protective relay to process the control data according to a result of the determination step (S130, S140). Here, said determining a communication protocol (S120) is determining whether it is the local monitoring dedicated protocol or remote monitoring dedicated protocol.

Figure 4:
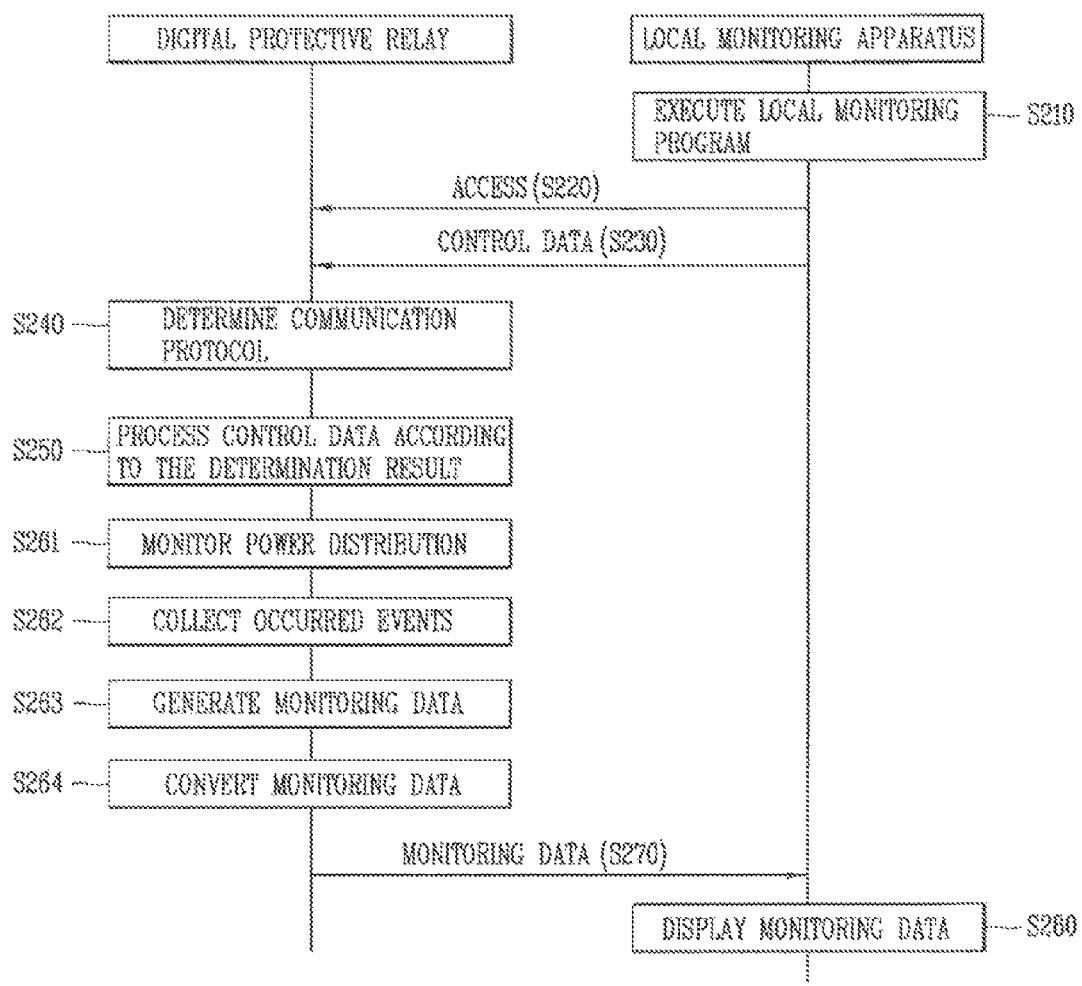
FIG. 4 is a flow chart schematically illustrating a method of power distribution in a digital protective relay according to another embodiment.
Figure 5:
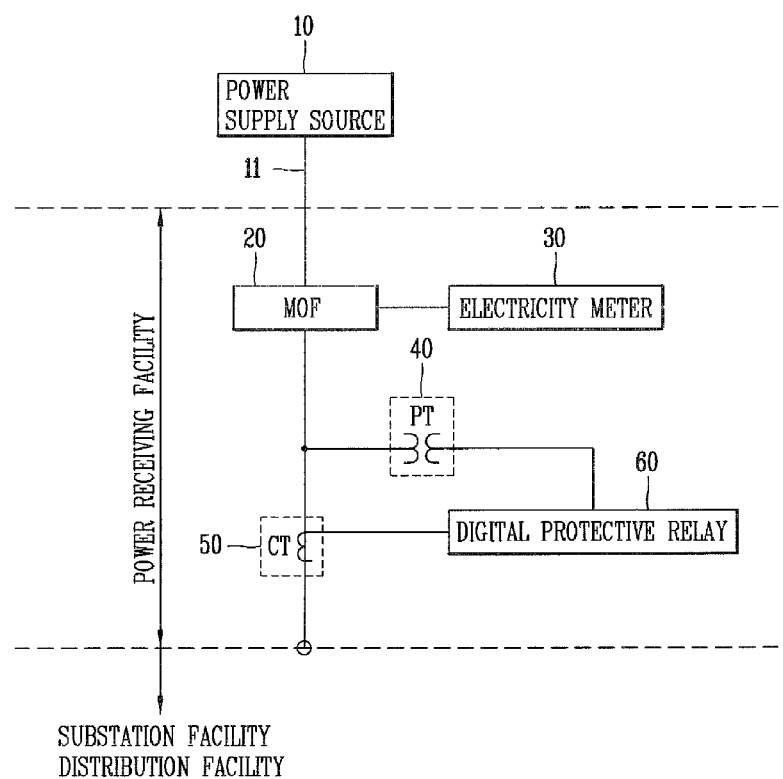
FIG. 5 is a view schematically illustrating the disconnection and connection of a power receiving facility.

Referring to FIG. 4, a power distribution monitoring method of a digital protective relay according to another embodiment may include allowing a local monitoring apparatus to execute a local monitoring program (S210), allowing the local monitoring apparatus to access the digital protective relay through the remote monitoring connection line (S220), and allowing the local monitoring apparatus to transmit the control data to the digital protective relay (S230). The another embodiment may further include allowing the digital protective relay to determine a communication protocol of the received control data (S240), and allowing the digital protective relay to process the control data according to a result of the determination step (S250). Here, said determining a communication protocol (S240) is determining whether it is the local monitoring dedicated protocol or remote monitoring dedicated protocol.

Referring to FIG. 4, a power distribution monitoring method according to the embodiments may include allowing the digital protective relay to monitor power distribution (S261), allowing the digital protective relay to collect events occurred while monitoring the power distribution (S262), allowing the digital protective relay to generate monitoring data based on the occurred event (S263), allowing the digital protective relay to convert the monitoring data using the determined communication protocol (S264), and allowing the digital protective relay to transmit the converted monitoring data through the remote monitoring connection line (S270).

The digital protective relay collects events occurred (S262) while monitoring power distribution (S261), and determines whether or not the collected event is contained in a predetermined (user defined) list, and then stores the collected data. The digital protective relay generates monitoring data according to a communication protocol based on the occurred event (S263, S264). In other words, the digital protective relay generates monitoring data using the occurred event (S263), and converts monitoring data according to the communication protocol determined at the step S240 (S264). In other words, the communication protocol may conform to a communication protocol of the control data received through a remote monitoring port. Here, the communication protocol may be a local monitoring dedicated protocol or remote monitoring dedicated protocol. The local monitoring program may be a PC manager program. The remote monitoring dedicated protocol is a remote SCADA protocol such as MODBUS or distributed network protocol (DNP) such as DNP 3.0.

The local monitoring apparatus or the remote monitoring apparatus displays monitoring data received from the digital protective relay on the screen (S280).

As described above, according to the present disclosure, a power distribution monitoring system of the digital protective relay may be configured with a local monitoring program and a self function of the digital protective relay, thereby reducing a cost burden due to the installation of a remote monitoring system and enhancing convenience based on the management. According to the present disclosure, it may be connected to one or more digital protective relays through a remote monitoring connection line to transmit and receive data using a local monitoring dedicated protocol, thereby easily processing various data contained in the digital protective relay. Furthermore, according to the present disclosure, various setting values required for a plurality of digital protective relays, respectively, may be accessed and downloaded once, thereby enhancing the user's convenience and increasing management efficiency.

What is claimed is:

1. A power distribution monitoring system of a digital protective relay, the system comprising:
   one or more digital protective relays provided with one or more remote monitoring ports connected via a remote monitoring connection line, the one or more digital protective relays configured to collect data related to events and generate monitoring data based on the events;
   a local monitoring apparatus provided with a local monitoring program and connected to the one or more digital protective relays via the remote monitoring connection line to receive the monitoring data using a local monitoring dedicated protocol; and
   a remote monitoring apparatus connected via the remote monitoring connection line to receive the monitoring data from the one or more digital protective relays using a remote monitoring dedicated protocol, wherein
   the one or more digital protective relays comprise:
   a communication module configured to transmit the monitoring data and receive control data and
   a control module configured to determine a communication protocol of the monitoring data, and process the control data using the local monitoring dedicated protocol or the remote monitoring dedicated protocol according to a result of the determination.

2. The system of claim 1, wherein the remote monitoring dedicated protocol is MODBUS or DNP.

3. The system of claim 1, wherein the remote monitoring connection line is a serial communication line or Ethernet communication line.

4. The system of claim 1, wherein the local monitoring apparatus comprises:
   a storage unit configured to store the local monitoring program;
   a communication unit connected to the one or more digital protective relays and configured to transmit control data to, or receive monitoring data from the one or more digital protective relays; and
   a controller configured to execute the local monitoring program.

* * * * *